(12) United States Patent
Borrego et al.

(10) Patent No.: US 8,265,784 B1
(45) Date of Patent: Sep. 11, 2012

(54) STORAGE LIBRARY HAVING VIRTUAL CARTRIDGE ACCESS PORT

(75) Inventors: Antonio Borrego, Superior, CO (US);
Donald Wait, Superior, CO (US);
Daniel J. Plutt, Superior, CO (US);
James L. Ries, Boulder, CO (US)

(73) Assignee: Oracle America, Inc., Redwood City, CA (US)

( * ) Notice: Subject to any disclaimer, the term of this patent is extended or adjusted under 35 U.S.C. 154(b) by 1846 days.

(21) Appl. No.: 11/315,815

(22) Filed: Dec. 22, 2005

(51) Int. Cl.
*G06F 7/00* (2006.01)
(52) U.S. Cl. .................................................. 700/214
(58) Field of Classification Search .................. 700/213, 700/214
See application file for complete search history.

(56) References Cited

U.S. PATENT DOCUMENTS

| | | | | |
|---|---|---|---|---|
| 5,761,503 A * | 6/1998 | Fisher | | 1/1 |
| 6,031,798 A * | 2/2000 | James et al. | | 369/30.28 |
| 6,067,481 A * | 5/2000 | Saliba et al. | | 700/214 |
| 6,338,006 B1 * | 1/2002 | Jesionowski et al. | | 700/214 |
| 6,480,905 B1 | 11/2002 | Jesionowski | | |
| 6,636,778 B2 * | 10/2003 | Basham et al. | | 700/214 |
| 6,791,910 B1 * | 9/2004 | James et al. | | 369/30.28 |
| 2003/0050729 A1 * | 3/2003 | Basham et al. | | 700/214 |
| 2004/0133915 A1 * | 7/2004 | Moody et al. | | 725/86 |
| 2004/0139094 A1 * | 7/2004 | Tyndall et al. | | 707/100 |
| 2005/0043852 A1 * | 2/2005 | Gallo et al. | | 700/214 |
| 2005/0267627 A1 * | 12/2005 | Lantry et al. | | 700/214 |

* cited by examiner

*Primary Examiner* — Ramya Burgess
(74) *Attorney, Agent, or Firm* — Brooks Kushman P.C.

(57) ABSTRACT

A library has a physical cartridge access port (PCAP) for receiving cartridges which are to be entered/ejected into/out of the library. The library is partitioned into partitions each having a set of the library cells such that the library appears to a host as multiple libraries with each partition appearing to the host as a respective one of the multiple libraries. Some cells are reserved for use by the partitions as virtual cartridge access ports (VCAPs) which appear to the host as being the PCAP such that cartridges, which are to be ejected out of the partitions, are exported from the cells of the partitions to the VCAPs for subsequent transfer from the VCAPs to the PCAP, and such that cartridges, which are to be entered into the partitions, are imported from the VCAPs to the cells of the partitions after having been moved from the PCAP to the VCAPs.

20 Claims, 2 Drawing Sheets

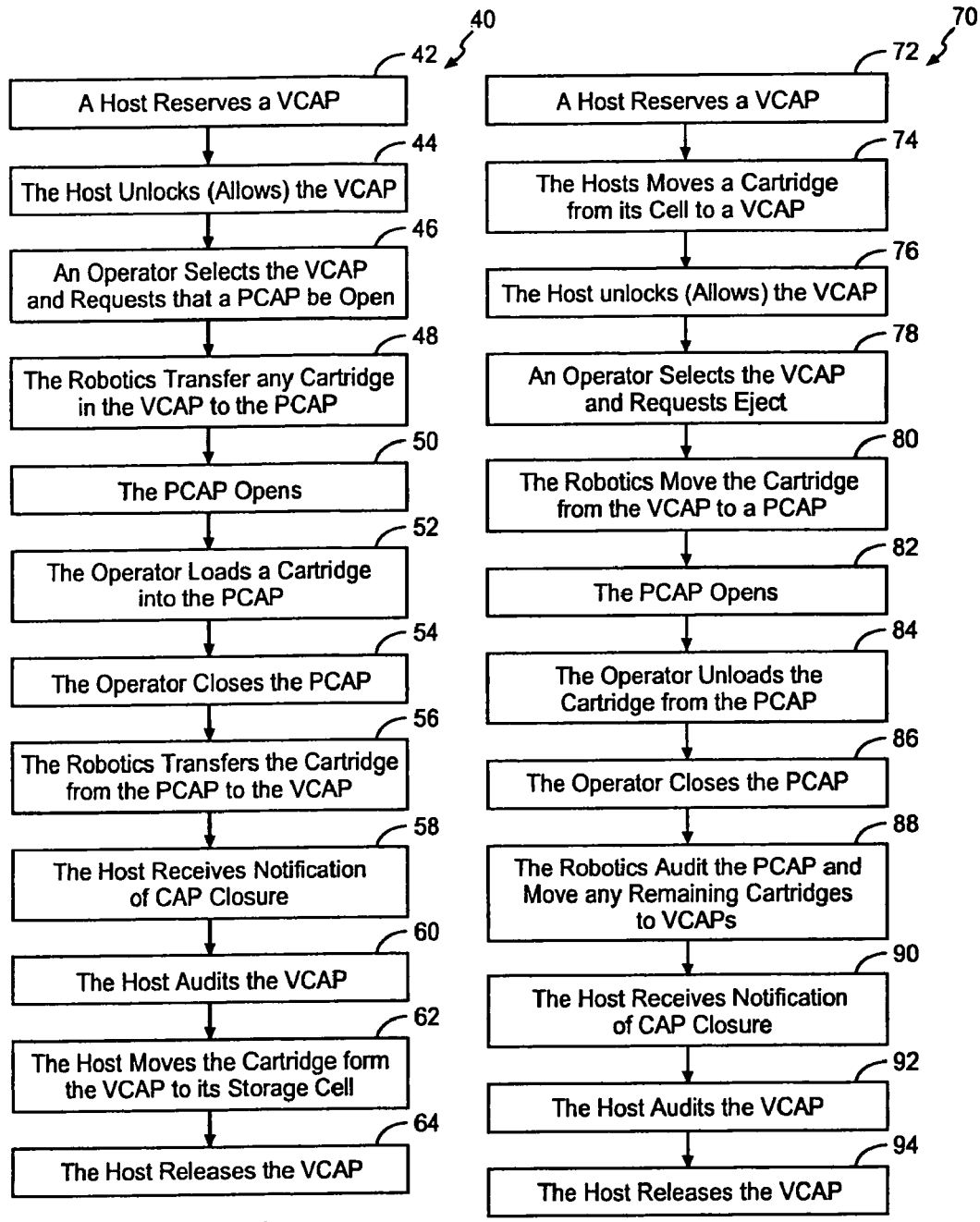

STORAGE LIBRARY HAVING VIRTUAL CARTRIDGE ACCESS PORT

BACKGROUND OF THE INVENTION

1. Field of the Invention

The present invention relates to a storage library having a cartridge access port for entering and ejecting cartridges into and out of the library.

2. Background Art

A storage library has cells for storing cartridges. A cartridge is a device which holds storage media such as tape. A robotics assembly move cartridges into and out of the cells. A physical cartridge access port (PCAP) provides ingress and egress paths for entering and ejecting cartridges into and out of the library.

A cartridge is entered into the library through the PCAP. The cartridge entering process begins with an operator placing the cartridge into the PCAP. The robotics assembly then removes the cartridge from the PCAP and places the cartridge into its cell in the library. As a result, the cartridge is entered into the library. A cartridge is ejected out of the library through the PCAP. The cartridge ejection process begins with the robotics assembly removing the cartridge from its cell in the library. The robotics assembly then places the cartridge into the PCAP. An operator then removes the cartridge from the PCAP. As a result, the cartridge is ejected out of the library.

A data center may have a large library that can be divided into a set of multiple library partitions. This can be done by partitioning the large library into library partitions such that each library partition appears as a respective one of a set of smaller libraries. A PCAP(s) physically shared by library partitions of a partitioned library can become a point of contention to the library partitions when entering and ejecting cartridges into and out of the library.

SUMMARY OF THE INVENTION

Accordingly, it is an object of the present invention to provide a non-partitioned storage library having cells and a physical cartridge access port (PCAP) in which at least one of the cells is virtualized to appear as being the PCAP.

It is another object of the present invention to provide a partitioned storage library having cells and a PCAP in which at least one of the cells is virtualized to appear as being the PCAP.

It is another object of the present invention to provide a storage library having cells and a PCAP in which the library is partitioned into library partitions and some of the cells are reserved for use by the partitions as VCAPs such that the partitions can freely move cartridges into and out of the reserved cells for the cartridge entering and ejecting processes without waiting for the PCAP to become available.

It is a further object of the present invention to provide a method of operating a storage library having cells and a PCAP in which the method includes partitioning the library into library partitions and reserving some of the cells for use by the partitions as VCAPs such that the partitions can freely move cartridges into and out of the reserved cells for the cartridge entering and ejecting processes without waiting for the PCAP to become available.

It is still another object of the present invention to provide a storage library having cells and a PCAP in which the library is partitioned into library partitions and some of the cells are reserved for use by the partitions as VCAPs such that cartridges, which are to be ejected out of the partitions, are exported from the cells of the partitions to the VCAPs and then transferred from the VCAPs to the PCAP as the PCAP is available.

It is still a further object of the present invention to provide a storage library having cells and a PCAP in which the library is partitioned into library partitions and some of the cells are reserved for use by the partitions as VCAPs such that cartridges, which are to be entered into the partitions, are moved from the PCAP to the VCAPs and then imported from the VCAPs to the cells of the partitions.

In carrying out the above objects and other objects, the present invention provides a data storage system having a library. The library includes storage cartridge cells. The library further includes one or more PCAPs for receiving cartridges which are to be entered/ejected into/out of the library. Some of the cells are reserved for use as VCAPs which appear to a host as being a PCAP such that cartridges, which are to be ejected out of the library, are exported from the cells to the VCAPs for subsequent transfer from the VCAPs to a PCAP, and such that cartridges, which are to be entered into the library, are imported from the VCAPs to the cells after having been moved from a PCAP to the VCAPs.

The library may be partitioned into partitions each having an independent set of the cells such that the library appears to the host as multiple libraries with each partition appearing to the host as a respective one of the multiple libraries. In this case, cartridges which are to be ejected out of the partitions are exported from the cells of the partitions to the VCAPs for subsequent transfer from the VCAPs to a PCAP; and cartridges which are to be entered into the partitions are imported from the VCAPs to the cells of the partitions after having been moved from a PCAP to the VCAPs. The VCAPs may reside in the same partition or the VCAPs may reside in different ones of the partitions. Each VCAP may be useable by each partition or the partitions may be associated with their own independent sets of the VCAPs such that a VCAP associated with one partition is not useable by another partition. In operation, the cartridges which are to be ejected out of the partitions are exported from the cells of the partitions to the VCAPs at a given time irrespective of whether a PCAP is available at the given time for receiving cartridges. Similarly, the cartridges which are to be entered into the partitions are imported from the VCAPs to the cells of the partitions at a given time irrespective of whether a PCAP is available at the given time for receiving cartridges.

The system may further include a robotics assembly operable for moving cartridges from the cells to the VCAPs for exporting the cartridges from the cells to the VCAPs and for moving the cartridges from the VCAPs to a PCAP for ejecting the cartridges out of the library. The robotics assembly is further operable for moving cartridges from the VCAPs to the cells for importing the cartridges from the VCAPs to the cells after moving the cartridges from a PCAP to the VCAPs for entering the cartridges into the library. In this case, the system may further include a media drive operable for performing data operations on a cartridge placed in the media drive. The robotic assembly is operable for moving cartridges between the media drive and the cells of the partitions.

The system may further include an interface operable with the host for enabling a human operator to direct cartridge movement.

Further, in carrying out the above objects and other objects, the present invention provides a method of operating a library having storage cartridge cells and having a PCAP for receiving cartridges which are to be entered/ejected into/out of the library. The method includes partitioning the library into multiple partitions each having an independent set of the cells such that the library appears to a host as multiple libraries with each partition appearing to the host as a respective one of the multiple libraries. The method further includes reserving some of the cells for use by the partitions as virtual cartridge access ports (VCAPs) which appear to the host as being the PCAP.

In operation, cartridges are ejected out of the partitions by exporting the cartridges from the cells of the partitions to the VCAPs for subsequent transfer from the VCAPs to the PCAP. The operation of ejecting cartridges out of the partitions may include identifying a cartridge stored in a cell of one of the partitions which is to be ejected out of the library; removing the cartridge from its cell and placing the cartridge into one of the VCAPs; removing the cartridge from the VCAP and placing the cartridge into the PCAP; subsequently notifying the host that the cartridge has been ejected out of the library; and removing the cartridge from the PCAP to complete the ejection of the cartridge from the library.

In operation, cartridges are entered into the partitions by importing the cartridges from the VCAPs to the cells of the partitions after the cartridges have been moved from the PCAP to the VCAPs. The operation of entering cartridges into the partitions may include identifying a cartridge which is to be entered into the library for storage in a cell of one of the partitions; placing the cartridge into the PCAP; removing the cartridge from the PCAP and placing the cartridge into one of the VCAPs; notifying the host that the cartridge has been imported into the library and stored in the cell of the one of the partitions; and subsequently removing the cartridge from the VCAP and placing the cartridge into the cell of the one of the partitions to complete the entering of the cartridge into the library.

Also, in carrying out the above objects and other objects, the present invention provides a method of operating a library having cartridge storage cells and having a PCAP for receiving cartridges which are to be entered/ejected into/out of the library. The method includes partitioning the library into multiple library partitions each having an independent set of the cells such that the library appears as multiple libraries with each partition appearing as a respective one of the multiple libraries. The method further includes reserving some of the cells for use by the partitions as VCAPs which appear as being the PCAP such that cartridges, which are to be ejected out of the partitions, are exported from the cells of the partitions to the VCAPs for subsequent transfer from the VCAPs to the PCAP, and such that cartridges, which are to be entered into the partitions, are imported from the VCAPs to the cells of the partitions after having been moved from the PCAP to the VCAPs. The method further includes issuing a cartridge request which involves use of the PCAP and using the VCAP in place of the PCAP to handle the cartridge request.

A cartridge request may involve entering a cartridge placed in the PCAP into the library for storage in a cell of one of the partitions. In this case, using the VCAP in place of the PCAP to handle the cartridge request includes removing the cartridge from the PCAP and placing the cartridge into the VCAP and then removing the cartridge from the VCAP and placing the cartridge into the cell of the one of the partitions to complete the entering of the cartridge into the library.

A cartridge request may involve ejecting a cartridge stored in a cell of one of the partitions out of the library. In this case, using the VCAP in place of the PCAP to handle the cartridge request includes removing the cartridge from the cell of the one of the partitions and placing the cartridge into one of the VCAPs, then removing the cartridge from the VCAP and placing the cartridge into the PCAP, and then removing the cartridge from the PCAP to complete the ejection of the cartridge out of the library.

Further, in carrying out the above objects and other objects, the present invention provides a data storage system having a library. The library includes storage cartridge cells and a PCAP for receiving cartridges which are to be entered/ejected into/out of the library. The library may be a non-partitioned library or a partitioned library. In either case, the operation of ejecting cartridges out of the library by exporting the cartridges from their cells may include marking a cartridge which is to be ejected out of the library as being ejected out of the library without actually physically moving the cartridge from its cell (i.e., marking the cartridge as being ejected even though the cartridge has not yet been moved from its cell) and then subsequently physically moving the cartridge from its cell to the PCAP in order to complete the ejection of the cartridge out of the library. Similarly, in either case, the operation of entering cartridges into the library by importing the cartridges to their cells may include moving a cartridge which is to be entered into the library from the PCAP to any given cell which is available for temporarily acting as the cartridge's cell, marking the cartridge as being entered into the library without actually physically moving the cartridge from the temporary cell to the cartridge's cell (i.e., marking the cartridge as being entered even though the cartridge has not yet been moved to its cell), and then subsequently physically moving the cartridge from the temporary cell to the cartridge's cell in order to complete the entering of the cartridge into the library.

Numerous advantages are associated with the present invention. For instance, storage library consolidation by partitioning large storage libraries is a key value proposition for the large storage libraries. Removing PCAP contention from partitioned storage libraries makes the consolidation easier. The VCAP concept is easily scalable to correspond to the number of library partitions of a partitioned storage library.

BRIEF DESCRIPTION OF THE DRAWINGS

FIG. 2 illustrates a flowchart describing the cartridge import (enter) process for a partitioned storage library in accordance with an embodiment of the present invention; and FIG. 3 illustrates a flowchart describing the cartridge export (eject) process for a partitioned storage library in accordance with an embodiment of the present invention.

DETAILED DESCRIPTION OF THE PREFERRED EMBODIMENT(S)

Figure 1:
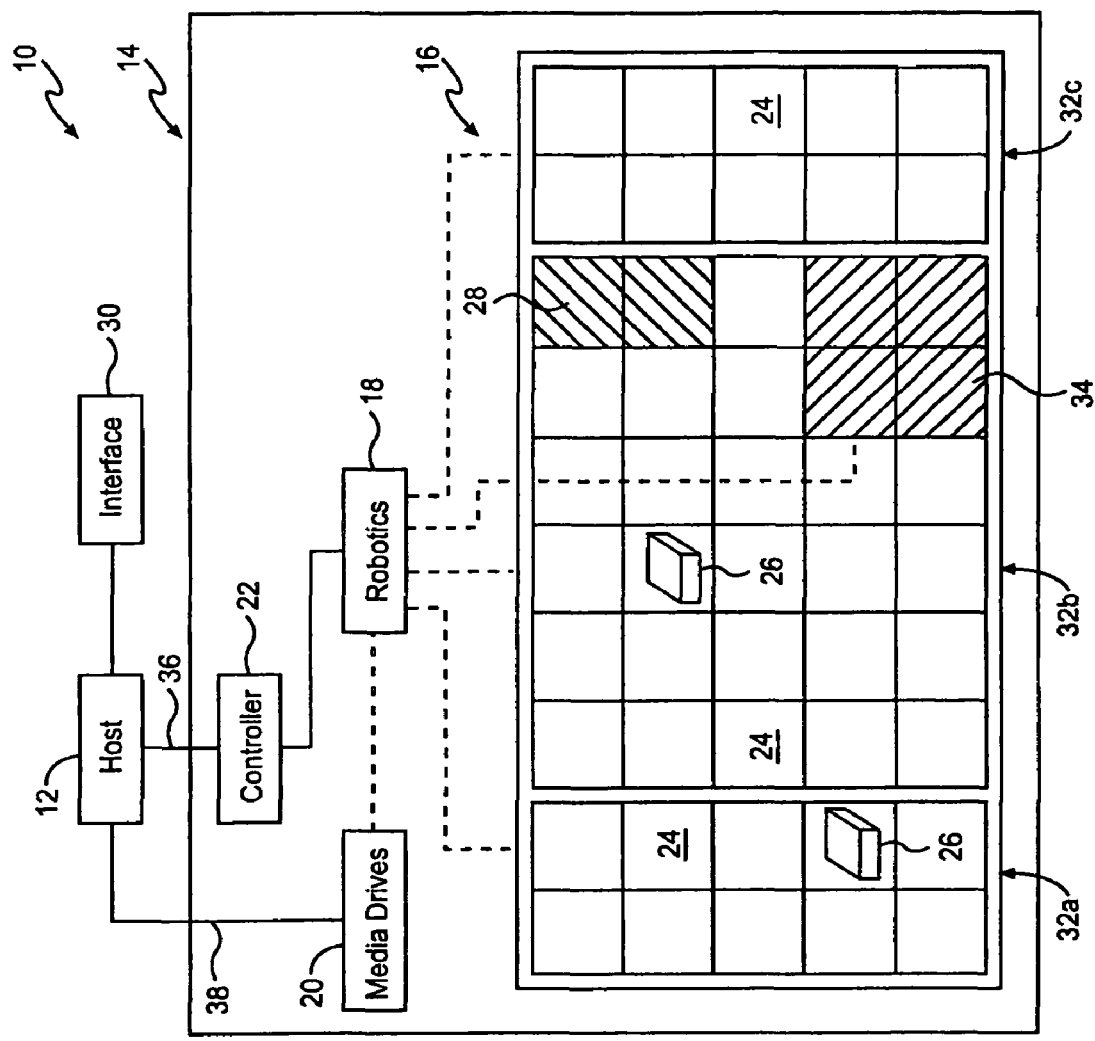
FIG. 1 illustrates a block diagram of a data storage system in accordance with an embodiment of the present invention.

Referring now to FIG. 1, a data storage system 10 in accordance with an embodiment of the present invention is shown. Data storage system 10 includes a host 12 and a storage library system 14. Storage library system 14 includes a storage library 16, a robotics assembly 18, one or more media drives 20, and a controller 22.

Storage library 16 includes one or more of different types of portable data storage media such as magnetic tape cartridges, optical cartridges, writeable CDs, etc. For ease of reference, the portable storage media are referred to herein as "cartridges" 26. Cartridges 26 have identification information associated therewith which is readable by robotics assembly 18 and/or a human operator. Storage library 16 includes a plurality of cartridge storage cells 24 for storing cartridges 26. Cells 24, which include physical shelves or other storage compartments, store cartridges 26 in storage library 16 when the cartridges are not being used. Cells 24 have respective physical addresses associated therewith.

Storage library system 14 includes one or more physical cartridge access ports (PCAPs) 28 which are associated with storage library 16. PCAPs 28 have respective physical addresses associated therewith. Each PCAP 28 provides an ingress path for entering cartridges 26 into storage library 16. A cartridge 26 to be entered into storage library 16 is placed into a PCAP 28, which in this case provides an ingress path into the storage library. Similarly, each PCAP 28 provides an egress path for ejecting cartridges 26 out of storage library 16. A cartridge 26 to be ejected out of storage library 16 is placed into a PCAP 28, which in this case provides an egress path out of the storage library.

Robotics assembly 18 moves cartridges 26 amongst cells 24 and moves the cartridges between the cells and PCAPs 28. For example, robotics assembly 18 removes a cartridge 26 from one cell 24 and places the cartridge into a different cell. Robotics assembly 18 removes a cartridge 26 from a PCAP 28 and places the cartridge into a cell 24 for the cartridge entering process. Robotics assembly 18 removes a cartridge 26 from a cell 24 and places the cartridge into a PCAP 28 for the cartridge ejecting process. Robotics assembly 18 may be implemented by any suitable cartridge movement machinery such as robotic arms, integrated cartridge loading equipment, conveyors, grippers movable on an x-y-z coordinate system, etc.

Media drives 20 perform read and write data operations on cartridges 26 placed within the drives. Drives 20 have respective physical addresses associated therewith. Robotics assembly 18 moves cartridges 26 between drives 20 and cells 24. For example, robotics assembly 18 removes a cartridge 26 from a cell 24 and places the cartridge into a drive 20. Similarly, robotics assembly 18 removes a cartridge 26 from a drive 20 and places the cartridge into a cell 24.

Controller 22 supervises the operation of storage library 16, robotics assembly 18, and drives 20. Controller 22 receives requests from host 12 requesting the controller to move cartridges 26 from one address to another address. For instance, in response to host commands, controller 22 instructs robotics assembly 18 to: remove a particular cartridge 26 from its cell 24 and place the cartridge in a particular drive 20; move a particular cartridge 26 from its cell 24 to a different cell 24; remove a cartridge 26 from a particular PCAP 28 and place the cartridge into its cell 24; etc. Data storage system 10 includes a control path 36 which host 12 and controller 22 use to communicate information regarding the requests with one another.

Data storage system 10 further includes a data path 38 which host 12 and drives 20 use to communicate data with one another. In operation, host 12 sends requests to controller 22 via control path 36 to store data on cartridges 26. Host 12 supplies the data to drives 20 via data path 38. Drives 20 then write the data onto cartridges 26 after robotics assembly 18 has moved the cartridges to the drives. Similarly, host 12 sends requests to controller 22 via control path 36 to retrieve data that is stored on cartridges 26. In response, robotics assembly 18 moves these cartridges 26 to drives 20 which then read the data stored on the cartridges. Drives 20 then supply this retrieved data to host 12 via data path 38.

Host 12 is coupled to an interface 30 which enables the host to exchange information with a human operator. The operator may use interface 30 to have host 12 direct operations of storage library 16. These operations include, for example, writing data to cartridges 26, retrieving data from the cartridges, moving cartridges to different cells 24, entering cartridges into storage library 16 for storage, ejecting cartridges out of the storage library, etc. Interface 30 includes any of a local or remote operator panel, a control panel, video monitor, computer keyboard/mouse, or any other appropriate human/machine interface.

Host 12 directs the cartridge entering and ejecting processes by issuing requests to controller 22 in which these requests include source and destination addresses. Host 12 and controller 22 use the addresses and the cartridge identification information in order to be know which cartridges are located where during the operation of storage library system 14 as well as to direct the movement of cartridges.

In a preferred embodiment, storage library 16 is partitioned into multiple library partitions 32. For example, as shown in FIG. 1, storage library 16 is partitioned into three library partitions 32*a*, 32*b*, and 32*c*. Each library partition 32 appears to host 12 as a single library and each partition includes its own set of cells 24. As such, storage library 16 appears to host 12 as three distinct libraries which each have their own set of cells 24 as a result of being partitioned into three partitions 32.

PCAPs 28 reside in an area which is not part of any of partitions 32. However, PCAPs 28 may reside in any or all of partitions 32. As shown in FIG. 1, as an example, PCAPs 28 reside in partition 32*b*. Partitions 32 share PCAPs 28 such that a first cartridge which is to be entered/ejected in/from a partition is placed into one of the PCAPs while a second cartridge which is to be entered/ejected in/from another partition is placed into the same PCAP once the PCAP is available. Alternatively, partitions 32 are associated with their own sets of PCAPs 28 and a PCAP associated with one partition may not be used for another partition.

Some of cells 24 of partitions 32 are reserved or allocated to be used as virtual cartridge access ports (VCAPs) 34. A cell 24 allocated to be used as a VCAP 34 appears to host 12 as a PCAP as opposed to appearing to the host as a cell (even though, in reality, a VCAP is a cell). That is, a VCAP 34 is a virtual PCAP. In this manner, partitions 32 appear to have more cartridge access ports than are physically present. Particularly, partitions 32 appear to have a number of cartridge access ports corresponding to the sum of PCAPs 28 and VCAPs 34. As such, partitions 32 include PCAPs 28 which are cartridge access ports that are physically present, and further include VCAPs 34 which are cartridge access ports that are virtually present (but appear to be cartridge access ports that are physically present).

VCAPs 34 reside in any partition 32, may be distributed amongst the partitions, or may reside in an area which is not a part of any of the partitions (as long as cells which can function as VCAPs are present in this area). For example, as shown in FIG. 1, VCAPs 34 reside in partition 32*b* and are concentrated in physical proximity to PCAPs 28.

Partitions 32 share VCAPs 34 such that a first cartridge which is to be entered/ejected in/from partition 32*a* is staged in a VCAP 34 (i.e., the first cartridge is physically placed in VCAP 34) while a second cartridge which is to be entered/ejected in/from partition 32*b* is staged in the same VCAP after the first cartridge has been removed from the VCAP. Alternatively, partitions 32 are associated with their own VCAPs 34 and a VCAP associated with one partition may not be used for another partition. Preferably, enough of cells 24 are allocated as VCAPs such that there is a small chance of any VCAP contention for the cartridge staging operations.

The Cartridge Import (Enter) Process

Host 12 conducts the cartridge entering process to enter cartridges 26 into partitions 32 for storage in cells 24 of the partitions. In accordance with the present invention, the cartridge entering process entails a cartridge import process. In general, the cartridge import process involves moving cartridges 26 from VCAPs 34 to cells 24 of partitions 32 after the cartridges have been transferred from PCAPs 28 to the VCAPs. The cartridge entering process generally begins with an operator placing into PCAP 28 a cartridge 26 which is to be entered into a partition 32 for storage in a cell 24 of the partition. Robotics assembly 18 removes cartridge 26 from PCAP 28 and places (i.e., stages) the cartridge into a VCAP 34 associated with partition 32. Robotics assembly 18 then removes cartridge 26 from VCAP 34 and places the cartridge in cell 24 of partition 32 (i.e., the cartridge is imported from the VCAP to the cell of the partition). As a result, cartridge 26 is entered into partition 32 and stored in cell 24 of the partition.

An operator may use an import utility of interface 30 to initiate the cartridge entering process. Staging cartridges 26 in VCAPs 34 (i.e., physically placing the cartridges into the VCAPs) effectively allows host 12 to perform further operations without contention for PCAPs 28. Once robotics assembly 18 is finished handling any current cartridge handling operations (including those operations involving cartridge entering and ejecting for other cartridges 26), controller 22 directs the robotics assembly to remove the staged cartridges 26 from VCAPs 34 and place the cartridges into their cells 24 of the respective partitions 32 (i.e., the robotics assembly imports the cartridges from the VCAPs to their cells). Subsequently, controller 22 notifies host 12 that cartridges 26 have been successfully imported.

The Cartridge Export (Eject) Events

Host 12 conducts the cartridge ejecting process to eject cartridges 26 out of partitions 32. In accordance with the present invention, the cartridge ejecting process entails a cartridge export process. In general, the cartridge export process involves moving cartridges 26 from cells 24 of partitions 32 to VCAPs 34 for subsequent transfer from the VCAPs to PCAPs 28. The cartridge ejecting process generally begins with robotics assembly 18 moving (i.e., staging) into a VCAP 34 a cartridge 26, which is to be ejected out of a partition 32, from its cell 24 of the partition into a VCAP 34 (i.e., the cartridge is exported from its cell to the VCAP). Robotics assembly 18 then removes cartridge 26 from VCAP 34 and places the cartridge into a PCAP 28 as the PCAP is available. An operator then removes cartridge 26 from PCAP 28. As a result, cartridge 26 is ejected out of partition 32.

An operator may use an export utility of interface 30 to initiate the cartridge ejecting process. Staging cartridges 26 in VCAPs 34 by physically moving the cartridges from their cells 24 to the VCAPs (i.e., exporting the cartridges from their cells to the VCAPs) effectively allows host 12 to perform further operations without contention for PCAPs 28. Once robotics assembly 18 is finished handling any current cartridge handling operations (including those operations involving cartridge entering and ejecting for other cartridges 26), controller 22 directs robotics assembly 18 to remove the staged cartridges 26 from VCAPs 34 and physically place the cartridges into PCAPs 28. Subsequently, controller 22 notifies host 12 that the cartridges have been successfully exported. Robotic assembly 18 and/or the human operator then physically remove cartridges 26 from PCAPs 28 to complete the ejection of these cartridges out of partitions 32.

Accordingly, some of cells 24 are allocated or reserved to partitions 32 to be used as VCAPs 34. Partitions 32 can then freely move cartridges 26 to and from their VCAPs 34 (i.e., their respective reserved cells) without waiting for a PCAP 28 to become available. This effectively decouples the actual import/export activity from the backup application's real time requirements.

Referring now to FIG. 2, with continual reference to FIG. 1, a flowchart 40 describing the cartridge import (enter) process for a partitioned storage library in accordance with an embodiment of the present invention is shown. In general, the cartridge import (enter) process is conducted to enter a cartridge 26 into a partition 32 for storage in a cell 24 of the partition. In the interest of simplification, the cartridge import (enter) process is described in flowchart 40 for importing (entering) one cartridge at a time. It is noted that many cartridges may be imported (entered) simultaneously at any given time.

The cartridge import (enter) process begins with host 12 reserving a VCAP 34 as shown in block 42. Host 12 then unlocks (allows) VCAP 34 as shown in block 44. An operator then selects a VCAP 34 and requests that a PCAP 28 be open as shown in block 46. It is noted that the operator can only choose from the VCAPs that are currently unlocked. Robotics assembly 18 then transfers any cartridge in VCAP 34 (should be none) to PCAP 28 as shown in block 48. PCAP 28 is then opened as shown in block 50. The operator then loads a cartridge 26 into PCAP 28 as shown in block 52. The operator then closes PCAP 28 (with storage library 16 being notified) as shown in block 54. Robotics assembly 18 then transfers cartridge 26 from PCAP 28 to VCAP 34 as shown in block 56. Host 12 is then notified of cartridge access port closure (unit attention on next command response) as shown in block 58. Host 12 then audits VCAP 34 as shown in block 60. Host 12 then directs robotics assembly 18 to move cartridge 26 in VCAP 34 to its cell 24 of partition 32 as shown in block 62. After cartridge 26 has been exported from VCAP 34 for placement in its cell 24 of partition 32, host 12 releases VCAP 34 as shown in block 64.

Referring now to FIG. 3, with continual reference to FIG. 1, a flowchart 70 describing the cartridge export (eject) process for a partitioned storage library in accordance with an embodiment of the present invention is shown. In general, the cartridge export (eject) process is conducted to eject a cartridge 26 out of a partition 32. Again, in the interest of simplification, the cartridge export (eject) process is described in flowchart 70 for exporting (ejecting) one cartridge at a time. It is noted that many cartridges may be exported (ejected) simultaneously at any given time.

The cartridge export (eject) process begins with host 12 reserving a VCAP 34 as shown in block 72. Host 12 then directs robotics assembly 18 to remove cartridge 26 from its cell 24 of partition 32 and place the cartridge into VCAP 34 as shown in block 74. Host 12 then unlocks (allows) VCAP 34 as shown in block 76. An operator then selects VCAP 34 and requests eject as shown in block 78. It is noted that the operator can only choose from the VCAPs that are currently unlocked. Host 12 then directs robotics assembly 18 to move cartridge 26 from VCAP 34 to a PCAP 28 as shown in block 80. PCAP 28 then opens as shown in block 82. The operator then unloads cartridge 26 from PCAP 28 as shown in block 84. The operator then closes PCAP 28 (with storage library 16 being notified) as shown in block 86. Robotics assembly 18 then audits PCAP 28 and moves any remaining cartridges to VCAPs 34 as shown in block 88. Host 12 is then notified of cartridge access port closure (unit attention on next command response) as shown in block 90. Host 12 then audits VCAP 34 as shown in block 92. Host 12 then releases VCAP 34 as shown in block 94.

While embodiments of the present invention have been illustrated and described, it is not intended that these embodiments illustrate and describe all possible forms of the present invention. Rather, the words used in the specification are words of description rather than limitation, and it is understood that various changes may be made without departing from the spirit and scope of the present invention.

What is claimed is:

1. A data storage system comprising:
   a physical library having storage cartridge cells, the library further having at least one physical cartridge access port (PCAP) for receiving cartridges which are to be entered into the library and for receiving cartridges which are to be ejected out of the library;
   wherein some of the cells are reserved for use as virtual cartridge access ports (VCAPs) which appear to a host as being a PCAP of the library such that cartridges, which are to be ejected out of the library, are exported from the cells to the VCAPs for subsequent transfer from the VCAPs to a PCAP of the library, and such that cartridges, which are to be entered into the library, are imported from the VCAPs to the cells after having been moved from a PCAP of the library to the VCAPs.

2. The system of claim 1 wherein:
   the library is partitioned into partitions each having an independent set of the cells such that the library appears to the host as multiple libraries with each partition appearing to the host as a respective one of the multiple libraries;
   wherein cartridges which are to be ejected out of the partitions are exported from the cells of the partitions to the VCAPs for subsequent transfer from the VCAPs to a PCAP of the library, and wherein cartridges which are to be entered into the partitions are imported from the VCAPs to the cells of the partitions after having been moved from a PCAP of the library to the VCAPs.

3. The system of claim 2 wherein:
   the VCAPs reside in at least one of the partitions.

4. The system of claim 2 wherein:
   each VCAP is useable by each partition.

5. The system of claim 2 wherein:
   the partitions are associated with their own independent sets of the VCAPs such that a VCAP associated with one partition is not useable by another partition.

6. The system of claim 2 wherein:
   the cartridges which are to be ejected out of the partitions are exported from the cells of the partitions to the VCAPs at a given time irrespective of whether a PCAP of the library is available at the given time for receiving cartridges.

7. The system of claim 6 wherein:
   the cartridges which are to be entered into the partitions are imported from the VCAPs to the cells of the partitions at a given time irrespective of whether a PCAP of the library is available at the given time for receiving cartridges.

8. The system of claim 1 further comprising:
   a robotics assembly operable for moving cartridges from the cells to the VCAPs for exporting the cartridges from the cells to the VCAPs and for moving the cartridges from the VCAPs to a PCAP of the library for ejecting the cartridges out of the library;
   the robotics assembly further operable for moving cartridges from the VCAPs to the cells for importing the cartridges from the VCAPs to the cells after moving the cartridges from a PCAP of the library to the VCAPs for entering the cartridges into the library.

9. The system of claim 8 further comprising:
   a media drive operable for performing data operations on a cartridge placed in the media drive;
   wherein the robotic assembly is operable for moving cartridges between the media drive and the cells of the partitions.

10. The system of claim 1 further comprising:
    an interface operable with the host for enabling a human operator to direct cartridge movement.

11. A method comprising:
    partitioning a physical library having storage cartridge cells and a physical cartridge access port (PCAP) for receiving cartridges which are to be entered into the library and for receiving cartridges which are to be ejected out of the library into multiple partitions each having an independent set of the cells such that the library appears to a host as multiple libraries with each partition appearing to the host as a respective one of the multiple libraries; and
    reserving some of the cells for use by the partitions as virtual cartridge access ports (VCAPs) which appear to the host as being the PCAP.

12. The method of claim 11 further comprising:
    ejecting cartridges out of the partitions by exporting the cartridges from the cells of the partitions to the VCAPs for subsequent transfer from the VCAPs to the PCAP.

13. The method of claim 12 wherein ejecting cartridges out of the partitions comprises:
    identifying a cartridge stored in a cell of one of the partitions which is to be ejected out of the library;
    removing the cartridge from its cell and placing the cartridge into one of the VCAPs;
    removing the cartridge from the VCAP and placing the cartridge into the PCAP;
    subsequently notifying the host that the cartridge has been ejected out of the library; and
    removing the cartridge from the PCAP to complete the ejection of the cartridge from the library.

14. The method of claim 11 further comprising:
    entering cartridges into the partitions by importing the cartridges from the VCAPs to the cells of the partitions after the cartridges have been moved from the PCAP to the VCAPs.

15. The method of claim 14 wherein entering cartridges into the partitions comprises:
    identifying a cartridge which is to be entered into the library for storage in a cell of one of the partitions;
    placing the cartridge into the PCAP;
    removing the cartridge from the PCAP and placing the cartridge into one of the VCAPs;
    notifying the host that the cartridge has been imported into the library and stored in the cell of the one of the partitions; and
    subsequently removing the cartridge from the VCAP and placing the cartridge into the cell of the one of the partitions to complete the entering of the cartridge into the library.

16. A method comprising:
    partitioning a physical library having cartridge storage cells and a physical cartridge access port (PCAP) for receiving cartridges which are to be entered into the library and for receiving cartridges which are to be ejected out of the library into multiple library partitions each having an independent set of the cells such that the library appears as multiple libraries with each partition appearing as a respective one of the multiple libraries;
    reserving some of the cells for use by the partitions as virtual cartridge access ports (VCAPs) which appear to a host as being the PCAP such that cartridges, which are to be ejected out of the partitions, are exported from the cells of the partitions to the VCAPs for subsequent transfer from the VCAPs to the PCAP, and such that cartridges, which are to be entered into the partitions, are imported from the VCAPs to the cells of the partitions after having been moved from the PCAP to the VCAPs;

issuing a cartridge request which involves use of the PCAP; and using the VCAP in place of the PCAP to handle the cartridge request.

17. The method of claim 16 wherein:

a cartridge request involves entering a cartridge placed in the PCAP into the library for storage in a cell of one of the partitions;

wherein using the VCAP in place of the PCAP to handle the cartridge request includes removing the cartridge from the PCAP and placing the cartridge into the VCAP and then removing the cartridge from the VCAP and placing the cartridge into the cell of the one of the partitions to complete the entering of the cartridge into the library.

18. The method of claim 16 wherein:

a cartridge request involves ejecting a cartridge stored in a cell of one of the partitions out of the library;

wherein using the VCAP in place of the PCAP to handle the cartridge request includes removing the cartridge from the cell of the one of the partitions and placing the cartridge into one of the VCAPs, then removing the cartridge from the VCAP and placing the cartridge into the PCAP, and then removing the cartridge from the PCAP to complete the ejection of the cartridge out of the library.

19. The method of claim 16 wherein:

the partitions are associated with their own independent sets of the VCAPs such that a VCAP associated with one partition is not useable by another partition.

20. The method of claim 16 wherein:

the VCAPs reside in the same partition.

* * * * *